United States Patent
Brant et al.

(10) Patent No.: US 6,423,420 B1
(45) Date of Patent: Jul. 23, 2002

(54) ORIENTED COEXTRUDED FILMS

(75) Inventors: Patrick Brant, Seabrook; David M. Fiscus, Houston, both of TX (US); Achiel Josephus Maria Van Loon, Scoten (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/367,909

(22) PCT Filed: Feb. 24, 1998

(86) PCT No.: PCT/US98/03562
§ 371 (c)(1),
(2), (4) Date: Aug. 20, 1999

(87) PCT Pub. No.: WO98/37140
PCT Pub. Date: Aug. 27, 1998

Related U.S. Application Data

(60) Provisional application No. 60/055,253, filed on Aug. 11, 1997.

(30) Foreign Application Priority Data

Feb. 24, 1998 (WO) .......................................... 98/37140

(51) Int. Cl.⁷ ............................................... B32B 27/32
(52) U.S. Cl. .................... 428/516; 428/910; 264/73.15; 264/173.19
(58) Field of Search ................................. 428/910, 516; 525/240; 264/173.15, 173.19

(56) References Cited

U.S. PATENT DOCUMENTS

| | | | |
|---|---|---|---|
| 5,358,792 A | * 10/1994 | Mehta et al. ................ | 428/516 |
| 5,376,439 A | * 12/1994 | Hodgson et al. ............ | 428/220 |
| 5,962,092 A | * 10/1999 | Kuo et al. .................. | 428/34.9 |
| 6,094,889 A | * 8/2000 | Van Loon et al. ............ | 53/450 |

FOREIGN PATENT DOCUMENTS

| | | |
|---|---|---|
| EP | 802046 | 10/1997 |
| WO | WO92/14784 | 9/1992 |
| WO | WO95/13321 | 5/1995 |
| WO | WO97/44178 | 11/1997 |

OTHER PUBLICATIONS

"Oriented Metallocene LLDPE Films—A New Option in Oriented Films" (1998).

* cited by examiner

*Primary Examiner*—D. Lawrence
(74) *Attorney, Agent, or Firm*—Frank E. Reid; Stephen D. Prodnuk

(57) ABSTRACT

An oriented multilayer film is provided, the film including in at least one outer layer an ethylene copolymer having a density of 0.900–0.935 g/cm³ and a CDBI of 50–95% the outer layer is in contact with a polypropylene core layer, and the film is made by coextrusion of the ethylene copolymer and the polypropylene layer and subsequent orientation. The coextruded layers can be uniaxially oriented or biaxially oriented without difficulties caused by presence of low molecular weight amorphous polymer fractions inherently present in traditional Ziegler-Natta linear low density polyethylene. The optical properties of oriented polypropylene films can be retained, while the sealing temperature is lowered and the heat seal strength and the hot tack performance properties are improved.

31 Claims, 1 Drawing Sheet

ORIENTED COEXTRUDED FILMS

RELATED APPLICATIONS

This application claims priority to U.S. Provisional Patent application Ser. Nos. 60/055,253, filed Aug. 11, 1997; 08/806182, filed Feb. 25, 1997 now U.S. Pat. No. 6,094,889; 08/847730, filed Apr. 28, 1997; abandoned; and 08/905211, filed Aug. 1, 1997 abandoned.

BACKGROUND OF THE INVENTION

1. Field of the Invention

This invention relates to an oriented, multilayered film comprising at least one layer of an ethylene based polymer. More specifically, this invention relates to a multilayer film made wherein at least one layer is ethylene based random copolymer, and wherein the film has been coextruded prior to being stretched for orientation.

2. Description of the Prior Art

Oriented, multilayered films are an important class of industrial products useful principally in the wrapping or packaging of various products in commerce. In particular, oriented isotactic polypropylene film is known to be useful for its high barrier properties, clarity and stiffness. Polypropylene for oriented films is typically isotactic homopolymer, or are modified polypropylene blends of isotactic polypropylene with differing isotactic polypropylene, e.g., differing melt flow rates (MFR) or tacticity, atatic polypropylene, syndiotactic polypropylene, random polypropylene copolymers having minor amounts of ethylene or higher α- olefins, and ethylene copolymers, see for example, U.S. Pat. No. 4,950,720 and WO 96/02386. As indicated in U.S. Pat. No. 4,921,749 and related art, other components such as petroleum resins may be added as well to modify properties such as heat sealing performance, gas permeability and stiffness. Such oriented polypropylene, particularly biaxially oriented polypropylene (BOPP), has many desirable properties. However, excellent hot tack and heat seal are not among these since such films lack significant heat sealing and hot tack performance at operating temperatures suited to efficient industrial practice.

WO 92/14784 suggests heat sealable blend compositions said to be suitable for film and film structures that include 30–70wt. % of a low melting polymer that may be an ethylene based copolymer having a density from 0.88 g/cm$^3$ to 0.915 g/cm$^3$ (g) MWD no greater than 3.5 and a composition distribution breadth index greater than 70 percent and (b) from (a) from 70 to 30 wt. % of a propylene based polymer having 88 mole % to 100 mole % propylene and from 12 mole % to 0 mole % of an alpha olefin other than propylene.

WO A 95/13321 suggests heat sealed articles and heat scalable films comprising a polymer blend of a first polymer having a narrow molecular weight and composition distribution and a second polymer having a broad molecular weight distribution and composition distribution.

Accordingly, various polymeric layers have been used or proposed as heat sealing layers for biaxially oriented polypropylene film. Among those used industrially and taught in the patent literature are polyolefins, ethylene-based and propylene-based. Preferred heat scaling layers for BOPP have in the past typically been high propylene-content polyolefins, e.g., propylene-ethylene copolymers with 1–20 wt % ethylene, and propylene-ethylene-butene terpolymers with up to about 10 wt % each of ethylene and butene and blends of those with other olefin polymers. See for example, U.S. patents 4,643,945 ) LLDPE with propylene terpolymer) and 4,921,749 (propylene-ethylene copolymers) and the others listed above. These polymer selections do reduce the chemical dissimilarity of the sealing layer and core layers so as to allow good adhesion between them, but result in the requirement that subsequent heat sealing be conducted at temperatures at or above 120° C., requiring long contact time with heating elements or high heat input to achieve the necessary temperature ranges.

SUMMARY OF THE INVENTION

The invention has an oriented multilayer film comprising at least one outer layer comprising from 50 to 100 wt. % of said outer layer an ethylene copolymer having a density of 0.900–0.935 g/cm$^3$ and a CDBI of 50–95% said outer layer being in contact with a polypropylene core layer, and said film having been made by coextrusion of said ethylene copolymer and said polypropylene layer and subsequent orientation. Preferably the ethylene copolymer outer or skin layer, or layers, will have a MWD ($M_w/M_n$) of 1.8–3.5 and a MI of 0.5–10 (ASTM D1238, 190° C., 2.16 kg). The coextruded layers can be biaxially oriented on tenter frame equipment without difficulties caused by the presence of low molecular weight amorphous polymer fractions inherently present in traditional Ziegler-Natta linear low density polyethylene. Problems of undesirable adherence to drums and jaws in processing and the presence of extractables in the films made hereby are essentially eliminated. Optical properties of biaxially oriented polypropylene films (BOPP) are retained while the scaling temperature is lowered and the heat seal strength and the hot tack properties are improved. The ethylene copolymer heat seal layer thus offers a practical, economical solution for preparing improved heat seal BOPP for all of stiff, flexible and heat shrinkable packaging.

Contemplated is an oriented multilayer film comprising at least one outer layer comprising an ethylene copolymer having a density of 0.900–0.935 g/cm$^3$ and a composition distributed breadth index (CDBI) of 50–95% constituting 50 to 100 wt. % of the outer layer, and the outer layer being in contact with a polypropylene core layer, the film being a coextrusion of said ethylene copolymer and the polypropylene layer and subsequent orientation. Wherein the film is biaxially oriented, the ethylene copolymer having a density of 0.910–0.935 g/cm$^3$, a molecular weight distribution (MWD) of 1.8–3.5, and a melt index (MI) determined according to ASTM D 1238 of 0.5–10. Wherein the ethylene copolymer has a density of 0.915–0.925 g/cm$^3$. Wherein the outer layer is a polyethylene blend composition comprising 50–99 wt % of the ethylene copolymer and 1–50 wt % essentially compatible ethylene-based homopolymers or copolymers comprising ethylene and one or more of $C_3$–$C_{12}$ α-olefins, cyclic olefins, vinyl aromatic and polar vinyl monomers, the blend composition having an overall density of from 0.910 to 0.925 and an melt index (MI) determined according to ASTM D 1238 of from 0.7 to 5.0 Wherein the essentially compatible ethylene-based copolymer constitutes up to 30 wt. % of the total blend and is an ethylene copolymer comprising one or more $C_4$–$C_8$ α-olefin having a density of from 0.880 to 0.915 g/cm$^3$. Wherein the polypropylene layer consists essentially of an isotactic polypropylene homopolymer or a polypropylene random copolymer. The film may comprise two of the outer layers and at least one polypropylene layer in contact with at least one of the outer layers. The second outer layer may be polypropylene.

BRIEF DESCRIPTION OF THE FIGURES

Figures are graphs of the heat seal (1$a$) and hot tack (1$b$) performance of the film of the examples.

DETAILED DESCRIPTION OF THE INVENTION

Figure 1B:
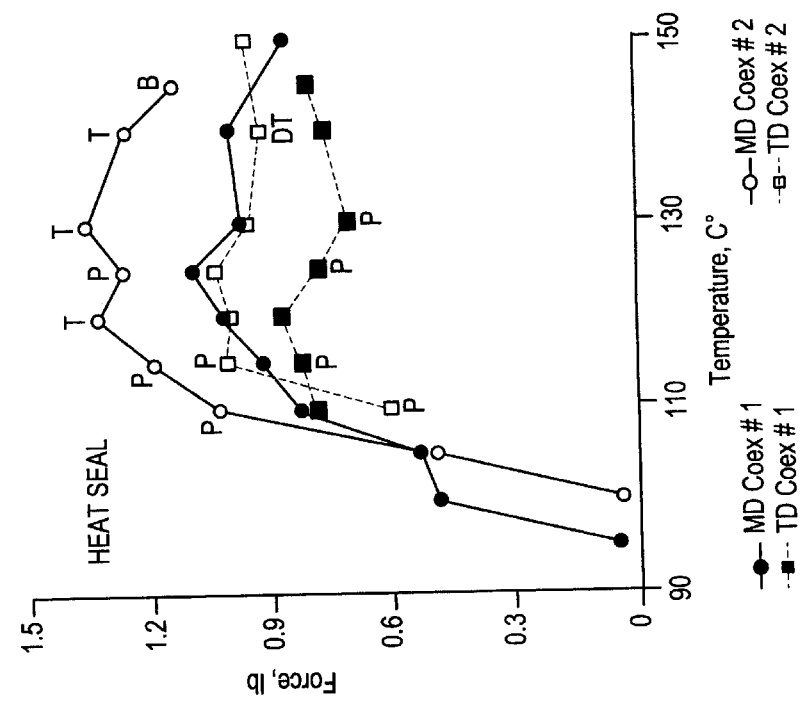

Ethylene copolymers suitable in accordance with the invention are commercially available and can be made by essentially single-sited catalysts such as metallocene catalysts. The use of the term "essentially single-sited catalysts" refers here to any olefin polymerization catalyst that provides narrow molecular weight distribution (MWD) $M_w/M_n$) and narrow composition distribution, as measured by the composition distribution breadth index (CDBI). Commercially available products specifically include the metallocene (LLDPE resins (m-LLDPE) marketed by Exxon Chemical Co., Houston, Tex., as EXCEED® 350D60 (ethylene-hexene copolymer, MI=1.0, density 0.917 g/cm$^3$) and 377L60 (ethylene-hexene copolymer MI=1.0, density 0.922), and the metallocene plastomer ethylene copolymers marketed under the tradenames EXACT®, available from Exxon Chemical Co. and AFFINITY®, available from Dow Chemical Company, Midland, Mich., where such plastomers have densities at or above 0.900. Typically the ethylene copolymers will comprise as comonomers any $C_3$–$C_{12}$ α-olefin, preferably one or more $C_4$–$C_8$ α-olefin. The comonomer content is established by the measured density, the density preferably being in the range from 0.910 to 0.925 g/cm$^3$, most preferably from 0.915 to 0.925 g/cm$^3$. Preferably the molecular weight of the invention ethylene copolymers as measured in MI (polyethylene melt index, ASTM D1238) will be in the range from 0.7–8.0, and most preferably 0.7–5.0. The MWD is typically about 2.0–3.5, preferably 2.0–2.7. The CDBI will preferably be above 55%, most preferably above 65%. The melt index ratios (MIR, $I_{21}/I_2$) of the suitable ethylene copolymers will typically range from 16 to 50. Additional description of film suitable ethylene copolymers can be found in copending U.S. application Ser. No. 08/755,105, filed Nov. 22, 1996.

Additional ethylene copolymer compositions suitable as sealing layers in accordance with the invention include polyethylene blend compositions wherein the ethylene copolymer defined above comprises at least 50 wt % and the complement is minor amounts of essentially compatible ethylene-based homopolymers or copolymers comprising ethylene and one or more of $C_3$–$C_{12}$ α-olefins, cyclic olefins, vinyl aromatic and polar vinyl monomers, such as norbornene, alkyl-substituted norbornenes, styrene, alkyl-substituted styrenes, vinyl acetate, acrylic acid, methyl acrylate, butylacrylate, etc. The blend compositions comprising ethylene-α-olefin copolymers are preferably those having an overall density of from 0.910 to 0.925 and MI of from 0.7 to 5.0. For blends comprising the other ethylene copolymers, the copolymers are preferably those having 2–5 mol % comonomer and equivalent MI. Specific blend polyethylene include any of LDPE, plastomers, LLDPE, MLDPE or HDPE, as those terms are used in the art, prepared by Ziegler-Natta polymerization, essentially single-sited coordination polymerization, and high pressure-free radical polymerization. Polymers comprising vinyl monomers include ethylene-vinyl (EVA), ethylene-vinyl alcohol (EVOH), ethylene acrylic acid (EAA), ethylene-methylacrylate (EMA). Blend suitable ethylene copolymers are those that have ethylene content sufficient to provide ethylene crystallinity so as to assure that the blend compositions will not be subject to gross phase separation within the blend compositions upon cooling.

Copolymers of lower crystallinity, and thus density at or below 0.915 ("VLDPE"), including certain plastomer ethylene copolymers with $C_4$–$C_8$ α-olefins having densities from 0.870 to 0.915 g/cm$^3$ are particularly suitable as blend components when present in sufficient amounts to allow increased line speeds due to the presence of the lower melting point, low density copolymers. The VLDPE copolymers will preferably be present in an amount up to 30 wt %, preferably from 15–20 wt. %. Further description of the VLDPE and its uses in film applications appears in U.S. patents 5,206,075 and 5,358,792.

Suitable polypropylene core or outer layer or layers will comprise any of the isotactic polypropylene compositions or blends known to be suitable for use as uniaxially or biaxially oriented films. The background art is instructive and is incorporated by reference for purposes of U.S. patent practice. Both of traditional Ziegler-Natta polypropylene resins and those of the newer essentially single-sited catalysts are suitable where having molecular weights sufficient to assure a match in melt viscosity suitable for coextrusion. Thus propylene polymers having melt flow rate "MFR" (ASTM D 1238, 230° C., 2.16 kg) of from 1.0 to 40, preferably to 10, most preferably to 6.0 are suitable. The film grade polypropylene products ESCORENE® PP4592 E7, PP4372, and PP 4252 E1 of Exxon Chemical Co. are particularly suitable. Additionally, polypropylene random copolymers containing up to 15 mol. % of at least one $C_2$–$C_8$ α-olefin other than propylene will be suitable as a coextrudable polypropylene layer, as core, outer or intermediary layer.

Methods of preparing coextruded films are well known in the art. For this invention the ethylene copolymer compositions suitable as sealing layers and the polypropylene compositions are separately but concurrently extruded and joined for coextrusion prior to orientation. Because the melt viscosity of the preferred ethylene copolymers, or blends comprising them, is high enough to maintain sufficient dimensional stability at processing temperatures necessary to extrude the polypropylene film, both of thick and thin films of uniform thickness across the film surface can be maintained. The lack of low molecular weight amorphous fractions and the sufficiently high melting points of the ethylene copolymer compositions allow excellent processing, without sticking to processing equipment yet while retaining the particularly suitable dimensional stability.

A preferred method of preparing the films according to the invention comprises a coextrusion process with subsequent orientation of the coextrudate. Though previously known in the industry that lower-melting point polymers can be applied by the coating method, where the polymer is extruded in a molten or softened state onto the preformed higher softening point polymer film, it is also known that the use of chemically dissimilar polymers can result in insufficient adhesion between the layers. Thus the use of additional tie layers (or adhesive layers) capable of adhering to both layers is often recommended when two different polymers are to be combined. See, e.g., J. Stepek, et al, *Polymers As Materials For Packaging*, Ch. 5, p. 346–349 (Ellis Horwood Ltd., 1987, English language edition).

The discovery of this invention however resulted from the observation that the use of coextrusion multiple extruders in two or more streams at least one of which provides the ethylene copolyer compositions and another of which provides the polypropylene compositions, and concurrent feeding into a multi-channel die such that the two layers are in contact with each other for slit-die extrusion and subsequent orientation, can be used to prepare films that retain excellent adhesion between the layers and excellent composite film properties without the need of additional tie or adhesive layers. The excellent clarity of BOPP is retained while the seal initiation temperature is decreased and the sealing properties of the film are increased both in total strength and without having to apply sufficient heating to soften the polypropylene layer. Since the sealing layer polymers of the invention have softening points from 80 to 100° C., and melting points between 100 and 120° C., the effective heat sealing temperature is lower than that of typical propylene copolymer sealing layers, can be achieved more quickly in processing and results in increased line speeds in manufacturing use.

Films according to the present invention particularly include oriented two-layer A/B films having the A sealing layer and a B outer layer of polypropylene or three-layer A/B/A films having two sealing layers A on either side of the core B polypropylene layer. Additional layers or treatments of the films in the B layer are also suitable, such known treatments as metallation or corona discharge treatment with the addition of other barrier layers or tie layers are also well known in the art to be applicable in any combination for specific articles of commerce. The A heat sealing layer can be on one side of a multilayered film, and can be used as another core layer, or on both sides to form an additional heat sealing layer. Such composite films will all benefit from the improved adherence of the A and B layers and the compatibility of the combined layered film for orientation, particularly uniaxial orientation and biaxial orientation, such as by use of the tenter frame methods of orientation. Additionally, the broad plateau sealing temperatures, i.e., about 110° C.–140° C. provide a significant advantage for industrial processes where accurate temperature controls are uneconomical are otherwise not available. The heat seals formed by pressing and heating together two such layers can fail largely by peeling within the noted plateau area when subjected to a breaking force of 1.32–6.6 kg (0.6–3.0 lb). This failure mechanism provides excellent characteristics for peelable seals useful in the packaging industry, particularly for flexible packaging. Higher peel strengths (>6.6 kg (3.0 lb), e.g., 6.6–13.2 kg (3.0–6.0lb) can be achieved by increasing the thickness of the heat sealing layer exemplified herein, and/or by introducing one or more additional coextruded tie or adhesive layer such as those comprising ethylene or propylene copolymers.

The polymer characterizations presented in this application were conducted under the following conditions and procedures. MI was determined as described in ASTM D 1238. All of $M_w$, $M_o$, and $M_w/M_a$ (MWD) were determined by gel permeation chromatography (GPC) using a DRI differential refraction index detector, i.e., a Waters 150C GPC instrument with DRI detectors. CDBI was determined in accordance with the method described in columns 7 and 8 of WO 93/03093. Density was measured in accordance with ASTM D792 for both the polyethylene and polypropylene.

EXAMPLES

<u>L</u> TM Long Experiments: coextruded structures were cast on a laboratory Killion line and then biaxially oriented (6×6) on a TM Long line to prepare a 2-layer A/B film, and a 3-layer ABA film respectively comprising one and two heat sealing layers of 5.08 μm (0.2 mil) final thickness each and a polypropylene core layer of 10.16 μm (0.4 mil) thickness. The ethylene copolymer heat sealing layers were extruded from EXCEED® 350D60 (ethylene-hexene copolymer, MI=1.0, density =0.912 g/cm$^3$) or 377L60 (ethylene-hexene copolymer, MI=1.0, density =0.922 g/cm$^3$) resins and the polypropylene layer was extruded from PD452E1, all available from Exxon Chemical Co. <u>IL</u>. Pilot Line Experiments: The films of Tables 1–4 below were prepared on a Black Clawson line and biaxially oriented on a tenter frame as described in the Tables 1–3 below. The film properties are presented in Table 4.

TABLE 1

Processing Information for Films made using Black Clawson Line*

| | A/B 10/90 (wt. ratio) | | | | |
| --- | --- | --- | --- | --- | --- |
| | 350D60 PD4252E1 | | 377L60 PD4252E1 | | A/B/A 10/80/10 (wt. ratio) A 377L60  B PD4252E1 |
| Film Gauge μm (mils) | 254 (10) | 508 (20) | 254 (10) | 508 (20) | 254 (10) |
| A-Layer: Barrier Screw: B Extruder | | | | | |
| Screw Speed (RPM) | 8 | | 8 | | 15 |
| Output Kg/m (lb./hr) | 21.3 (47) | | 21.3 (47) | | 41.8 (92) |
| Melt Temp. (° F./° C.) | (550)/288 | | (559)/293 | | (560)/293 |
| Load (Amps) | 67 | | 56 | | 107 |
| Volts | 25 | | 22 | | 41 |
| Head Press. (psi/kPa) | (1847)/12,735 | | (1715)/11,824 | | (2950)/20,340 |
| B-Layer: Metering Screw: A Extruder | | | | | |
| Screw Speed (RPM) | 151 | | 141 | | 131 |
| Output Kg/hr (Pounds/hr) | 192.2 (423) | | 192.2 (423) | | 167.2 (368) |
| Melt Temp. (° F./° C.) | (586)/308 | | (585)/307 | | — |
| Load (Amps) | 128 | | 128 | | 123 |
| Volts | 469 | | 431 | | 406 |

TABLE 1-continued

Processing Information for Films made using Black Clawson Line*

|  | A/B 10/90 (wt. ratio) | | | | A/B/A 10/80/10 (wt. ratio) |
|---|---|---|---|---|---|
|  | 350D60 PD4252E1 | | 377L60 PD4252E1 | | A 377L60  B PD4252E1 |
| Film Gauge μm (mils) | 254 (10) | 508 (20) | 254 (10) | 508 (20) | 254 (10) |
| Head Pressure kPa (PSI) | 28,270 (4100) | | 29,414 (4266) | | 28,862 (4186) |
| Output Kg/hr (Pounds/hr) | | | | | |
| Total | 213 (470) | | 213 (470) | | 209 (460) |
| Line Speed MPM (FPM) | | | | | |
|  | 15.24 (50) | | 8.22 (27) | | 13.1 (43) |

*Screw speed and Specific output were the same for all films. 8.89 cm (3.5 inch) 30:1 L/D, 1.06 m (42 inch) Wide Die. Air Knife Pinning. Primary Chill Roll was (87° F.) 31° C. and Secondary Chill Roll was (75° F.) 24° C. Line speed was adjusted to achieve the desired gauge. All other processing conditions were constant.

TABLE 2

MD Conditions used for Cast Films*

| Coextruded Films | A/B 10/90 | | A/B/A 10/80/10 |
|---|---|---|---|
|  | 350D60/ PD4252E1 | 377L60/ PD4252E1 | A 377L60/ B PD4252E1 |
| Roll Temperature ° C. (° F.) | | | |
| Preheat |  | 132 (270) |  |
| Slow Draw |  | 129.4 (265) |  |
| Fast Draw |  | 129.4 (265) |  |
| Annealing |  | 121 (250) |  |
| Cooling |  | 20 (68) |  |
| MD Draw | | | |
|  | 4/5 | 5 | 5 |

*Stretch Gap of 0.081 cm (0.032 Inch). Draw Speed was Adjusted to Achieve desired MD Draw Ratio.

TABLE 3

TD Orienting Conditions used for Cast Films

| Coextruded Films | A/B 10/90 | | | A/B/A 10/80/10 |
|---|---|---|---|---|
|  | 350D60 PD4252E1 | | 377L60 PD4252E1 | A 377L60 B PD4252E1 |
| Initial Gauge μm (mils) | 250.4 (10) | 500.8 (20) | 250.4 (10) | 500.8 (20) |
| Oven Temperatures by Oven Section ° C. (° F.) | | | | |
| Preheat | | | 157 (315°) | |
| Stretch | | | 157 (315°) | |
| Anneal | | | 148.8 (300°) | |
| Line Speed mpm (ft./min.) | | | | |
|  | 18.28 (60) | 6.09 (20) | 18.28 (60) | 15.24 (50) |
| TD Draw | | | | |
|  | 6 | 8 | 6 | 6 |

TABLE 4

Film Properties of Biaxially Oriented Coextruded Film

| Film Structure | A/B 10/90 | | | | | A/B/A 10/80/10 |
|---|---|---|---|---|---|---|
| Type Material | 350D60/ PD 4252E1 | | | 377L60/ PD 4252E1 | | A 377L60/B PD 4252E1 |
| Initial Gauge μm (mils) | 250.4 (10) | 500.8 (20) | 250.4 (10) | 250.4 (10) | 500.8 (20) | 250.4 (10) |
| MD/TD Draw Ratio* | | | | | | |
| Engineering | 4:6 | 5:9 | 3:8 | 4:8 | 5:8 | 5:6 |
| Gauge Mic μm (mils) | | | | | | |
| Testing Area Average Measuretech Profiler | 7.11 (0.28) | 8.38 (0.33) | 7.36 (0.29) | 6.35 (0.25) | 10.9 (0.43) | 8.12 (0.32) |
| Gauge Average μm (mils) | 6.8 (0.27) | 8.38 (0.33) | 8.89 (0.35) | 5.58 (0.22) | 9.9 (0.39) | 7.8 (0.31) |
| Low | 5.08 (0.20) | 5.08 (0.20) | 7.36 (0.29) | 4.57 (0.18) | 8.6 (0.34) | 6.09 (0.24) |
| High | 9.9 (0.39) | 13.7 (0.54) | 13.2 (0.52) | 7.11 (0.28) | 14.7 (0.58) | 10.9 (0.43) |

TABLE 4-continued

Film Properties of Biaxially Oriented Coextruded Film

| Film Structure | A/B 10/90 | | | | | A/B/A 10/80/10 |
|---|---|---|---|---|---|---|
| Type Material | 350D60/ PD 4252E1 | | 377L60/ PD 4252E1 | | | A 377L60/B PD 4252E1 |
| Initial Gauge μm (mils) | 250.4 (10) | 500.8 (20) | 250.4 (10) | 250.4 (10) | 500.8 (20) | 250.4 (10) |
| Dart Drop Method A | | | | | | |
| (g) | 228 | 168 | 168 | 181 | 263 | 275 |
| g/μm (g/mil) | 32 (814) | 20 (509) | 22.8 (579) | 28.5 (724) | 24 (612) | 33.8 (859) |
| Puncture (Inside)* | | | | | | |
| Peak Force Kg (lb.) | 7.22 (15.09) | 7.78 (17.13) | 6.75 (14.87) | 5.7 (12.57) | 10.4 (22.83) | 6.75 (14.85) |
| Peak Force Kg/μm (lb./mil) | 4.66 (53.90) | 4.5 (51.90) | 4.4 (51.28) | 4.35 (50.26) | 4.6 (53.09) | 4.0 (46.41) |
| Break Energy J (in-lb.) | 0.85 (7.60) | 0.58 (5.17) | 0.8 (7.07) | 0.53 (4.72) | 0.84 (7.43) | 0.96 (8.54) |
| Break Energy J/μm (in-lb./mil) | 0.12 (27.13) | 0.07 (15.67) | 0.108 (24.37) | 0.08 (18.86) | 0.076 (17.28) | 0.11 (26.70) |
| Puncture (Outside)* | | | | | | |
| Peak Force Kg (lb.) | 5.15 (11.34) | 32.1 (14.62) | 4.4 (9.75) | 4.5 (10.04) | 8.2 (18.05) | 6.8 (15.02) |
| Peak Force Kg/μm (lb./mil) | 0.72 (40.51) | 0.8 (44.31) | 0.6 (33.62) | 0.71 (40.15) | 0.75 (41.97) | 0.84 (46.94) |
| Break Energy J (in-lb.) | 0.55 (4.89) | 0.46 (4.09) | 0.41 (3.67) | 0.38 (3.38) | 0.64 (5.73) | 1.0 (8.88) |
| Break Energy J/μm (in-lb./mil) | 0.07 (17.48) | 0.055 (12.40) | 0.056 (12.64) | 0.06 (13.50) | 0.06 (13.33) | 0.12 (27.75) |
| Tensile @ Yield kPa (psi) | | | | | | |
| MD | 47,451 (6,882) | 48,161 (6,985) | 46,010 (6,673) | 49,871 (7,233) | 52,126 (7,560) | 37,439 (5,430) |
| TD | 104,190 (15,111) | 295,561 (42,866) | 171,850 (24,924) | 190,295 (27,599) | 264,361 (38,341) | 82,422 (11,954) |
| At 200% MD | 0 | 0 | 79,023 (11,461) | 0 | 0 | 0 |
| Ultimate Tensile kPa (psi) | | | | | | |
| MD | 131,204 (19,029) | 132,597 (19,231) | 89,200 (12,937) | 129,943 (18,846) | 162,866 (23,621) | 110,637 (16,046) |
| TD | 239,601 (34,750) | 454,628 (65,936) | 311,867 (45,231) | 329,891 (47,845) | 456,262 (66,173) | 179,187 (25,988) |
| Elongation @ Yield (%) | | | | | | |
| MD | 4.1 | 4.3 | 4.2 | 4.2 | 4.5 | 4.2 |
| TD | 5.9 | 5.6 | 5.3 | 5.6 | 5.9 | 5.8 |
| Break Elongation (%) | | | | | | |
| MD | 133 | 140 | 239 | 155 | 142 | 145 |
| TD | 26 | 15 | 17 | 19 | 21 | 31 |
| Initial Gauge (mils) | 10 | 20 | 10 | 10 | 20 | 10 |
| 1% Secant kPa (psi) | | | | | | |
| MD | 2,101,802 (304,830) | 2,329,337 (337,830) | 2,197,229 (318,670) | 2,090,357 (303,170) | 2,406,355 (349,000) | 1,917,982 (278,170) |
| TD | 3,180,870 (461,330) | $7.94 \times 10^6$ (1,153,670) | $51.62 \times 10^5$ (748,670) | $54.34 \times 10^5$ (788,170) | $67.24 \times 10^5$ (975,330) | $26.4 \times 10^5$ (383,330) |
| Elmendorf Tear** | | | | | | |
| MD (g) | 1 | 2 | 2 | 1 | 2 | 2 |
| MD g/μm (g/mil) | 0.16 (4) | 0.23 (6) | 0.23 (6) | 0.19 (5) | 0.19 (5) | 0.23 (6) |
| TD (g) | 0 | 1 | 0 | 0 | 1 | 1 |
| TD g/μm (g/mil) | 0 | 0.115 (3) | 0 | 0 | 0.08 (2) | 0.115 (3) |
| Shrink (%) | | | | | | |
| MD | 57 | 58 | 58 | 64 | 72 | 42 |
| TD | 79 | 82 | 88 | 86 | 86 | 71 |
| Haze (%) | 0.63 | 0.77 | 1.07 | 0.97 | 0.97 | 1.20* |
| Gloss (45°) | 93 | 90 | 88 | 87 | 88 | 92* |
| COF (kf) | | | | | | |
| (I/I) | No Sample | .49 | .46 | .43 | .39 | >1.0 |
| (I/O) | | .51 | .43 | .40 | .40 | |

TABLE 4-continued

Film Properties of Biaxially Oriented Coextruded Film

| Film Structure | A/B 10/90 | | | | | A/B/A 10/80/10 |
|---|---|---|---|---|---|---|
| Type Material | 350D60/ PD 4252E1 | | 377L60/ PD 4252E1 | | | A 377L60/B PD 4252E1 |
| Initial Gauge μm (mils) | 250.4 (10) | 500.8 (20) | 250.4 (10) | 250.4 (10) | 500.8 (20) | 250.4 (10) |
| (O/O) WVTR g/μm/m²/day (gm × mil/100" sq/day) | | .52 5.2 (0.34) | .53 | .49 | .44 5.3 (0.35) | |

*Engineering draw ratios were determined during the trial. The Actual draw ratios were determined from the films produced.
**Tear values were based on using a 200 gram pendulum. ASTM states that tear values are to be obtained from readings between 20–60% of pendulum weight. The tear values were so low, this was impossible.
***Used 2 slip sheets of HDPE.

ILL. The films of the following examples 1–4 were prepared by coextruding and casting a 2-layer tape, and then biaxially orienting. The casting was done on a Black-Clawson line and the orientation on a pilot tenter line. The resulting films are described in Table 5 and the conditions used to orient the films on the pilot tenter line are summarized in Table 6.

Figure 1A:
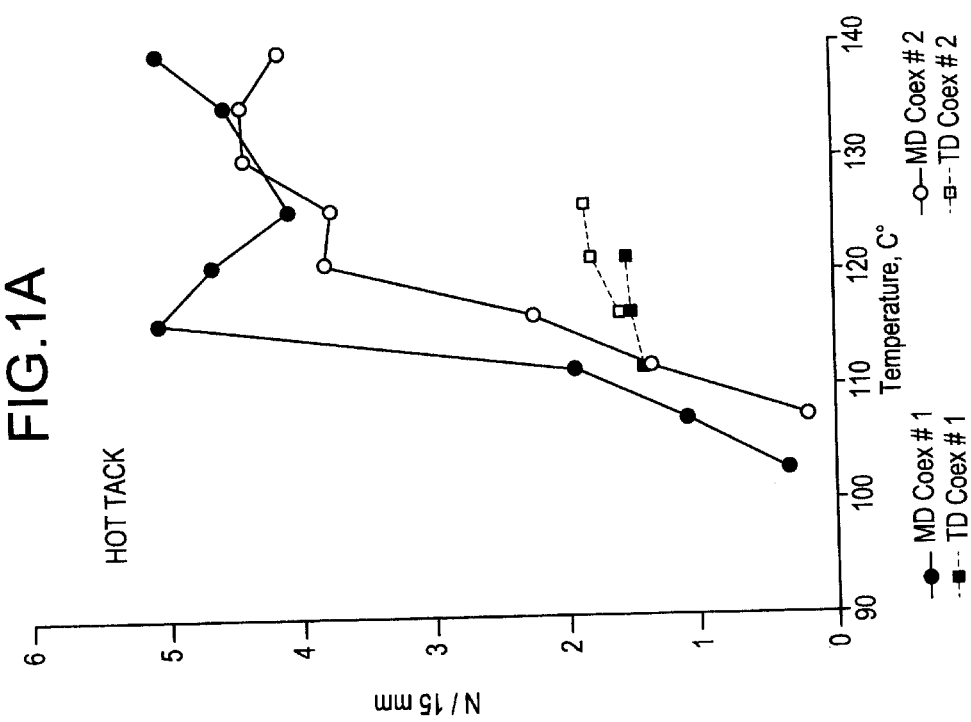

The properties of the coextruded film were similar to those of biaxially oriented polypropylene film without the heat seal layer. For example, the products retained excellent optics (haze and gloss), Elmendorf tear was essentially equivalent 0.0039 g/μm(0.10 g/mil). The ethylene copolymer heat seal layer was just (0.03 to 0.12 mil) 0.7–3.0 μm, but microscopic examination showed that the heat seal layer drew uniformly with the polypropylene. Hot tack (1a) and sealing (1b) performance were measured along both machine direction (MD) and transverse direction (TD), see FIG. 1. Though highly oriented, the seals introduced exhibited excellent appearance without observable shrinkage. For these examples the seal failure occurred at moderate force levels fully acceptable in industry, and the failure mechanism was largely by peeling rather than by tearing or breaking. The mode of failure at the exemplified moderate force levels. illustrate utility for peelable seals desired for many packaging applications. The hot tack measurement, also in FIG. 1, illustrate suitable values for the heat sealing at between 110–120° C., a significant advantage over those temperatures required for heat sealing layers comprising polypropylene copolymers.

TABLE 5

Examples of A/B Coextruded Structures
Biaxially Oriented on Pilot Tenter Line

| Co-extruded Sample # | m-LLDPE | Polypropylene | Orientation, TD × MD | Final Film Thickness, μm (mil) |
|---|---|---|---|---|
| 1 | 10% 350D60 | 90% PD4252E1 | 5 × 9 | 8.3 (0.33) |
| 2 | 10% 377L60 | 90% PD4252E1 | 5 × 8 | 9.9 (0.39) |
| 3 | 10% 350D60 | 90% PD4252E1 | 4 × 6 | 6.8 (0.27) |
| 4 | 10% 377L60 | 90% PD4252E1 | 3 × 8 | 8.89 (0.35) |

TABLE 6 b. MD Orientation

| Coextruded Sample # | Eng'g. Orientation | Input Film Speed, m/s (ft/s) | Pre-heat Rolls, ° C. | Draw Rolls, ° C. | Anneal Rolls, ° C. | Chill Rolls, ° C. |
|---|---|---|---|---|---|---|
| 1 | 5 | 3.04 (10) | 132 | 126 | 120 | 21 |
| 2 | 5 | 3.04 (10) | 132 | 126 | 120 | 21 |
| 3 | 4 | 3.04 (10) | 132 | 126 | 120 | 21 |
| 4 | 3 | 3.04 (10) | 132 | 126 | 120 | 21 | b. TD Orientation

| Coextruded Sample # | Eng'g. Orientation | Pre-heat, ° C. | Stretch, ° C. | Anneal, ° C. |
|---|---|---|---|---|
| 1 | 9x | 132 | 160 | 149 |
| 2 | 8x | 132 | 160 | 149 |
| 3 | 6x | 132 | 157 | 149 |
| 4 | 8x | 132 | 157 | 149 |

What is claimed is:

1. An oriented multilayer film, comprising:
   (a) at least one outer layer consisting essentially of at least one ethylene copolymer having a density of 0.900 to 0.935 g/cm³ and a composition distribution breadth index of 50 to 95%; and
   (b) a polypropylene core layer in contact with the at least one outer layer, the film being made by coextrusion of the at least outer layer and the core layer, and subsequent orientation.

2. The oriented multilayer film of claim 1, wherein the film is biaxially oriented.

3. The oriented multilayer film of claim 1, wherein the ethylene copolymer has a molecular weight distribution of 1.8 to 3.5, and a melt index $I_{2.16}$ of 0.5 to 10 g/10 min.

4. The oriented multilayer film of claim 1, wherein the polypropylene core layer comprises an isotactic polypropylene homopolymer or a polypropylene random copolymer.

5. The oriented multilayer film of claim 1, wherein the film comprises two outer layers and the polypropylene core layer is disposed between the two outer layers.

6. The oriented multilayer film of claim 1, wherein the subsequent orientation is carried out using a tenter frame orientation process.

7. An oriented multilayer film, comprising:
   (a) at least one outer layer consisting essentially of a blend of (i) a first blend component of at least one ethylene copolymer having a density of 0.900 to 0.935 g/cm$^3$ and a composition distribution breadth index of 50 to 95%, and (ii) a second ethylene polymer blend component selected from ethylene homopolymers, copolymers of ethylene and at least one comonomer selected from $C_3$–$C_{12}$ α-olefins, cyclic olefins, vinyl aromatic and poly vinyl monomers, and mixtures thereof; and (b) a polypropylene core layer in contact with the at least one outer layer, the film being made by coextrusion of the at least one outer layer and the core layer, and subsequent orientation.

8. The oriented multilayer film of claim 7, wherein the film is biaxially oriented.

9. The oriented multilayer film of claim 7, wherein the ethylene copolymer of the first blend component has a molecular weight distribution of 1.8 to 3.5, and a melt index $I_{2.16}$ of 0.5 to 10g/10 min.

10. The oriented multilayer film of claim 7, wherein the outer layer blend consists essentially of 50 to 99 wt % of the first blend component and 1 to 50 wt % of the second blend component.

11. The oriented multilayer film of claim 7, wherein the second blend component includes a copolymer of ethylene and one or more $C_4$–$C_8$ α-olefin comonomers, the copolymer having a density of from about 0.880 to about 0.915 g/cm$^3$ and being present in an amount of up to 30 wt % on the total weight of the outer layer blend.

12. The oriented multilayer film of claim 7, wherein the second blend component includes at least one copolymer of ethylene and 2–5 mol % cyclic olefin, vinyl aromatic or polar vinyl comonomers.

13. The oriented multilayer film of claim 7, wherein the polypropylene core layer comprises an isotactic polypropylene homopolymer or a polypropylene random copolymer.

14. The oriented multilayer film of claim 7, wherein the film comprises two outer layers and the polypropylene core layer is disposed between the two outer layers.

15. The oriented multilayer film of claim 7, wherein the subsequent orientation is carried out using a tenter frame orientation process.

16. An oriented multilayer film, comprising:
(a) at least one outer layer consisting essentially of a blend of
(i) a first blend component of at least one ethylene copolymer having a density of 0.900 to 0.935 g/cm$^3$ and a composition distribution breadth index of 50 to 95%, and
(ii) a second blend component selected from LDPE, plastomers, LLDPE, MLDPE, HDPE, and mixtures thereof; and
(b) a polypropylene core layer in contact with the at least one outer layer, the film being made by coextrusion of the at least outer layer and the core layer, and subsequent orientation.

17. The oriented multilayer film of claim 16, wherein the film is biaxially oriented.

18. The oriented multilayer film of claim 16, wherein the polypropylene core layer comprises an isotactic polypropylene homopolymer or a polypropylene random copolymer.

19. The oriented multilayer film of claim 16, wherein the film comprises two outer layers and the polypropylene core layer is disposed between the two outer layers.

20. The oriented multilayer film of claim 16, wherein the subsequent orientation is carried out suing a tenter frame orientation process.

21. An oriented multilayer film, comprising:
(a) at least one outer layer consisting essentially of a blend of
(i) a first blend component of at least one ethylene copolymer having a density of 0.900 to 0.935 g/cm$^3$ and a composition distribution breadth index of 50 to 95%, and
(ii) a second blend component of at least one VLDPE having a density of 0.915 g/cm$^3$ or less; and
(b) a polypropylene core layer in contact with the at least one outer layer, the film being made by coextrusion of the at least outer layer and the core layer, and subsequent orientation.

22. The oriented multilayer film of claim 21, wherein the film is biaxially oriented.

23. The oriented multilayer film of claim 21, wherein the at least one VLDPE is a copolymer of ethylene and one or more $C_4$–$C_8$ α-olefin comonomers, the copolymer having a density of from 0.870 to 0.915 g/cm$^3$ and being present in an amount of up to 30 wt % based on the total weight of the outer layer blend.

24. The oriented multilayer film of claim 21, wherein the polypropylene core layer comprises an isotactic polypropylene homopolymer or a polypropylene random copolymer.

25. The oriented multilayer film of claim 21, wherein the film comprises two outer layers and the polypropylene core layer is disposed between the two outer layers.

26. The oriented multilayer film of claim 21, wherein the subsequent orientation is carried out using a tenter frame orientation process.

27. An oriented multilayer film, comprising:
(a) at least one outer layer comprising a blend of
(i) 50 to 99 wt % of a first blend component of at least one ethylene copolymer having a density of 0.900 to 0.935 g/cm$^3$ and a composition distribution breadth index of 50 to 95%, and
(ii) 1 to 50 wt % of a second blend component selected from ethylene homopolymers, copolymers of ethylene and at least one comonomer selected from $C_3$–$C_{12}$α-olefins, cyclic olefins, vinyl aromatic and polar vinyl monomers, and mixtures thereof, the blend having an overall density of from about 0.910 to about 0.925 g/cm$^3$ and a melt index of about 0.7 to 5.0 g/10 min.
(b) a polypropylene core layer in contact with the at least one outer layer, the film being made by coextrusion of the at least outer layer and the core layer, and subsequent orientation.

28. The oriented multilayer film of claim 27, wherein the film is biaxially oriented.

29. The oriented multilayer film of claim 27, wherein the polypropylene core layer comprises an isotactic polypropylene homopolymer or a polypropylene random copolymer.

30. The oriented multilayer film of claim 27, wherein the film comprises two outer layers and the polypropylene core layer is disposed between the two outer layers.

31. The oriented multilayer film of claim 27, wherein the subsequent orientation is carried out using a tenter frame orientation process.

\* \* \* \* \*